No. 721,998. PATENTED MAR. 3, 1903.
J. W. CARTWRIGHT.
WEIGHING SCALE.
APPLICATION FILED AUG. 1, 1902.
NO MODEL. 2 SHEETS—SHEET 1.
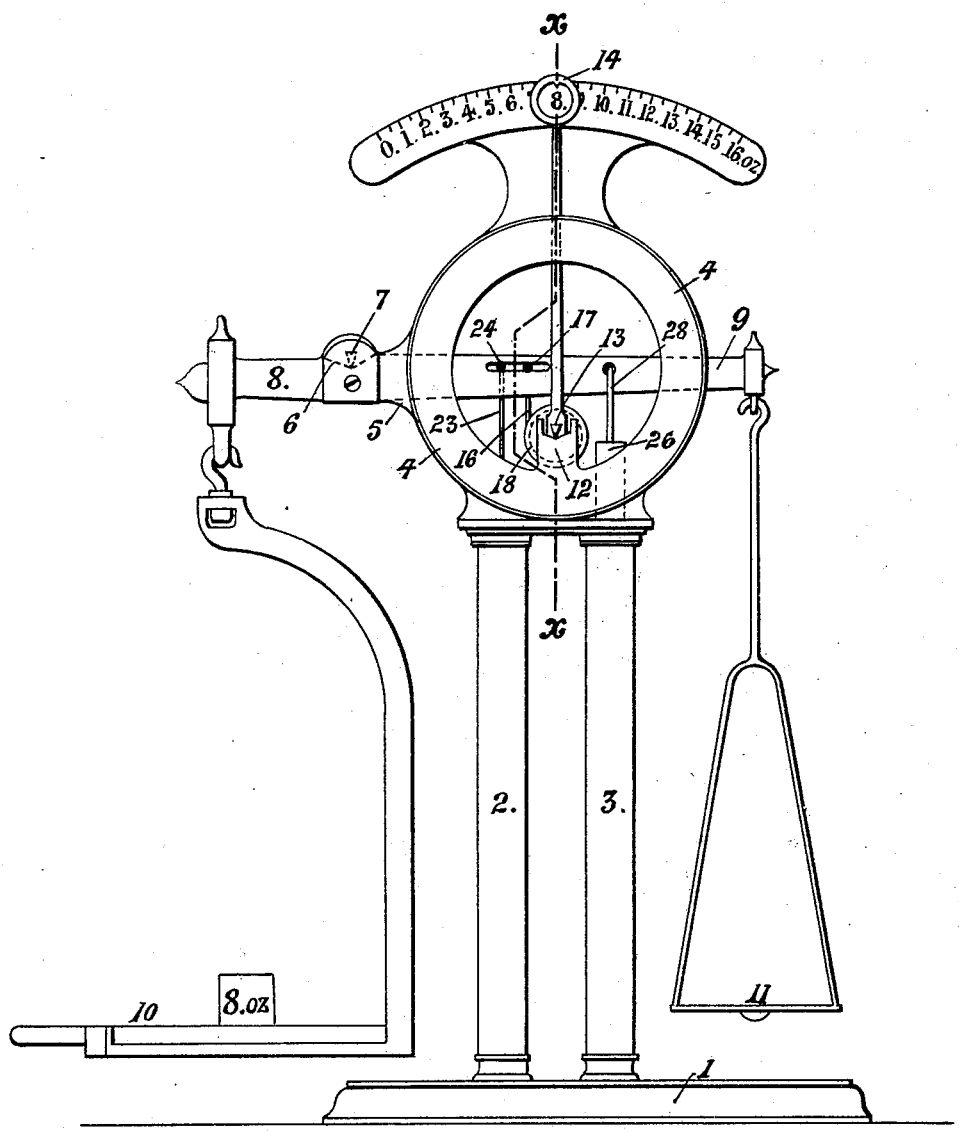
Fig I.
Witnesses
Frank Quail
T. Audley
Inventor
Joseph Wilbraham Cartwright
per Chas Coventry
Attorney.

No. 721,998. PATENTED MAR. 3, 1903.
J. W. CARTWRIGHT.
WEIGHING SCALE.
APPLICATION FILED AUG. 1, 1902.
NO MODEL. 2 SHEETS—SHEET 2.
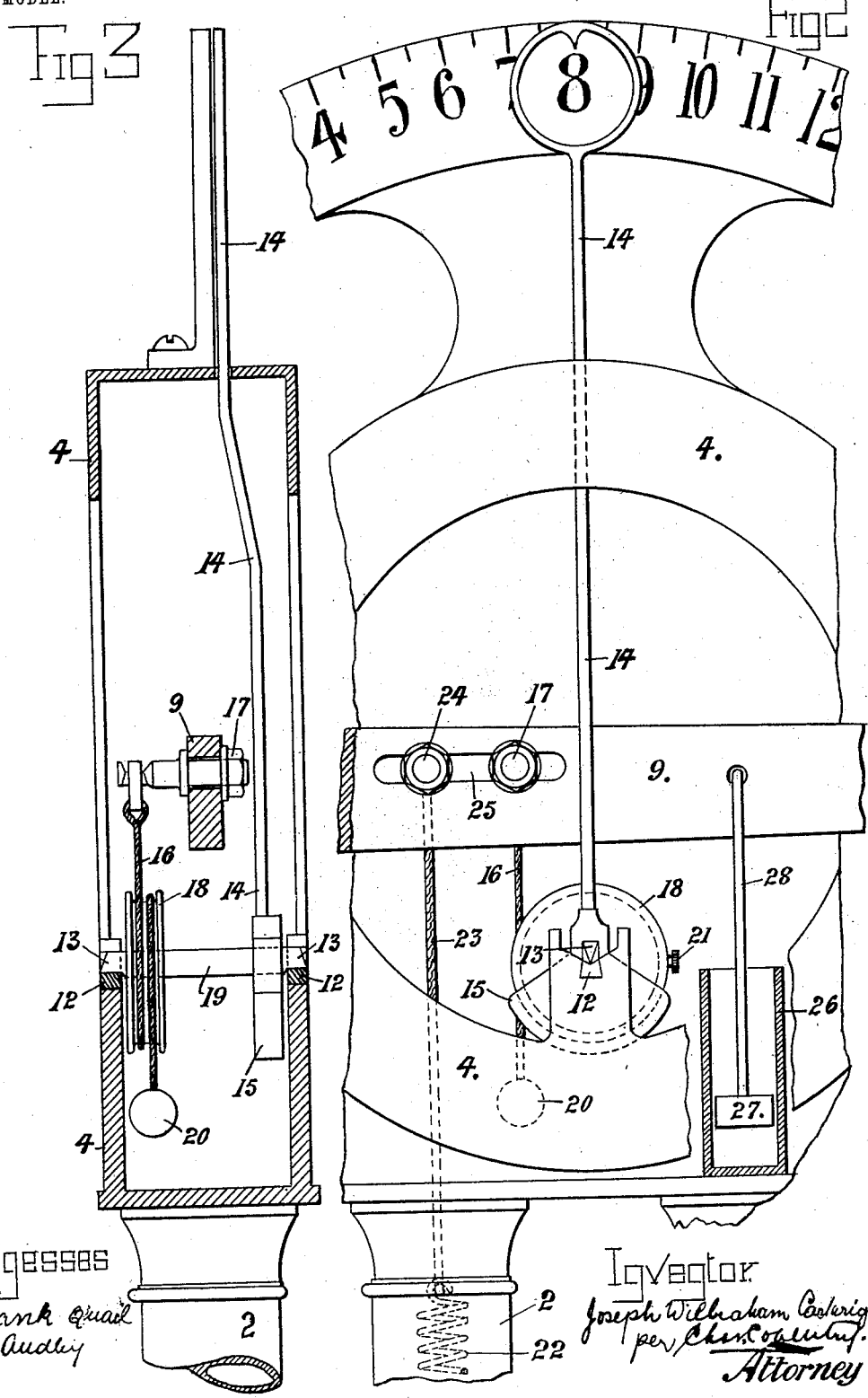
Witnesses
Frank Quail
Y. Audley
Inventor
Joseph Wilbraham Cartwright
per Chas Coventry
Attorney

UNITED STATES PATENT OFFICE.

JOSEPH WILBRAHAM CARTWRIGHT, OF SOUTHPORT, ENGLAND.

WEIGHING-SCALE.

SPECIFICATION forming part of Letters Patent No. 721,998, dated March 3, 1903.

Application filed August 1, 1902. Serial No. 118,001. (No model.)

*To all whom it may concern:*

Be it known that I, JOSEPH WILBRAHAM CARTWRIGHT, a subject of the King of Great Britain and Ireland, residing at 53 Lytham road, Marshside, Southport, in the county of Lancaster, England, have invented a new and useful Improvement in Weighing-Scales, of which the following is a specification.

My invention relates to weighing-scales in which the weighing is done by means of a combination of weights and a spring.

The object of the invention is to cause the spring to so act that the fractional amounts are indicated on a dial or quadrant, while the units are determined by separate weights placed in the weight-pan of the scales.

I will describe my invention as adapted to weigh provisions, for instance, in pounds and ounces; but I do not confine it to this use or to these denominations of weight.

In the drawings, Figure 1 is a front elevation of a pair of scales constructed in accordance with my invention. Fig. 2 is a view of a portion of Fig. 1, but drawn to a larger scale. Fig. 3 is a section as on line $x\,x$ of Fig. 1 and drawn to the same scale as Fig. 2.

1 is the base-plate, and 2 3 are hollow standards which support a cylindrical casing 4, which carries a bracket 5. This bracket 5 has bearings 6 for the knife-edge 7 of the beam or steelyard composed of two unequal arms 8 and 9.

10 is the scale-pan for the goods, and 11 that for the weights. The weights are made proportional to the length of the arms 8 and 9.

Near the bottom of casing 4 are bearings 12 for the knife-edge pivot 13 of the pointer 14. Said pointer carries a counterweight 15. When the beam or steelyard moves, the pointer 14 also moves, and this is effected by a cord or chain 16, attached at 17 to arm 9, and which has a turn around a drum 18, said drum being mounted on the same spindle 19 as the pointer 14. A small weight 20 on the other end of cord 16 serves to return pointer 14 to zero.

21, Fig. 2, is a pinching-screw to prevent slip of cord 16 on drum 18 and to allow of setting or adjustment of the pointer.

Standard 2 contains a spiral spring 22, (see Fig. 2,) which is connected, as by cord 23, with the arm 9 by nut 24 or equivalent.

25 is a slot in arm 9 to allow of adjustment in obvious manner.

26 is a dash-pot, which may conveniently contain glycerin and the plunger 27 whereof is connected to arm 9 by rod 28. Its function is to shorten the oscillations when the apparatus is in use.

The mode of action is as follows: Supposing goods of the weight, for example, of eight ounces are placed on scale-pan 10, the arm 8 sinks and arm 9 rises, thus pulling on cord 23 and extending spring 22 and oscillating pointer 14. The increasing resistance of spring 22 soon equals the pull on it of cord 23, and the apparatus comes to rest, as clearly shown in Fig. 1. If it be desired to weigh goods of more than sixteen ounces in weight, weights are placed in the pan 11. It will thus be clear that the pointer indicates fractions of a pound, and weights are used for one pound or a multiple thereof. In other words, weights are used for units and the spring for fractions.

What I claim as my invention, and desire to secure by Letters Patent, is—

In weighing-scales having a spring adapted to pull against the goods and a cord adapted to oscillate a pointer when the beam moves, the slot 25 whereby the radial positions of the cord and the spring may be adjusted, substantially as described and shown.

In testimony whereof I have signed my name to this specification in the presence of two subscribing witnesses.

JOSEPH WILBRAHAM CARTWRIGHT.

Witnesses:
  CHAS. COVENTRY,
  FRANK QUAIL.